Figure 1:
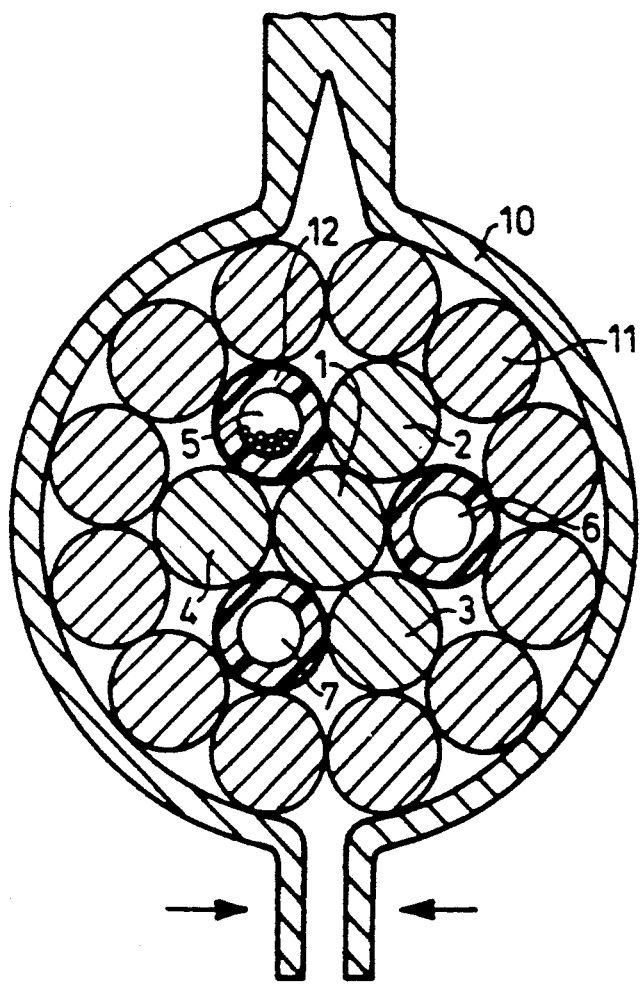

United States Patent [19]
Oestreich

[11] Patent Number: 5,069,526
[45] Date of Patent: Dec. 3, 1991

[54] EARTH-WIRE OVERHEAD CABLE

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 477,939

[22] PCT Filed: Dec. 1, 1988

[86] PCT No.: PCT/DE88/00747

§ 371 Date: Aug. 6, 1990

§ 102(e) Date: Aug. 6, 1990

[87] PCT Pub. No.: WO89/06039

PCT Pub. Date: Jun. 29, 1989

[30] Foreign Application Priority Data

Dec. 15, 1987 [DE] Fed. Rep. of Germany ....... 3742925

[51] Int. Cl.$^5$ ............................................. G02B 6/44
[52] U.S. Cl. ..................................... 385/101; 385/113
[58] Field of Search ................ 350/96.20, 96.21, 96.23

[56] References Cited

U.S. PATENT DOCUMENTS

| | | | |
|---|---|---|---|
| 4,671,611 | 6/1987 | Allemand et al. | 350/96.23 |
| 4,801,192 | 1/1989 | Wehner | 350/96.23 |
| 4,861,947 | 8/1989 | Altermah et al. | 350/96.23 X |
| 4,902,097 | 2/1990 | Worthington et al. | 350/96.23 |

FOREIGN PATENT DOCUMENTS 1598540 9/1981 United Kingdom .

OTHER PUBLICATIONS

Patent Abstracts of Japan, vol. 2, No. 61 (E-78) 1703, May 9, 1978 & JP-A-53 24582 (Hitachi Densen) Jul. 3, 1978.

*Primary Examiner*—John D. Lee
*Assistant Examiner*—Phan T. Heartney
*Attorney, Agent, or Firm*—Kenyon & Kenyon

[57] ABSTRACT

In overhead line systems, communication cables can also be integrated in the electric power cables to transmit the information that is important for the operation of the system. When these communication cables consist of optical transmission elements, they must be protected from being pinched in the wire clamps when they are secured. The cross-section of the earth-wire overhead cable is designed so that a few steel wires in the stranded bond form a tension-proof and transverse-pressure resistant supporting structure, in whose clearance spaces communication cables, in particular optical transmission elements find space.

2 Claims, 1 Drawing Sheet

EARTH-WIRE OVERHEAD CABLE

The invention relates to an earth-wire overhead cable having integrated optical transmission elements and consisting of several stranded elements, of which at least one contains an optical transmission element, whereby the cable features a central steel wire onto which one or several layers of steel wires are stranded and whereby around the stranded core thus formed in at least one steel wire layer, at least one layer of stranded elements made of hard aluminum or of an aluminum alloy is configured around the stranded core thus formed.

In an electricity supply network, the nodal points of the network must be interconnected by communication cables. They enable the exchange of information which is required for the operation of the network. The communication cables are expediently run parallel to the power supply lines or are even integrated in these lines. When a communication cable is integrated in an earth-wire overhead cable, it is advantageous to use an optical transmission element as a communication cable, due to its considerable interference immunity from electromagnetic pulses (DE-AS 26 04 766).

In the Great Britain PS 15 98 540, a cable is described which has one of its conductive, aluminum, stranded elements, replaced by an optical transmission element.

Optical transmission elements such as optical waveguides or optical waveguide bundles are by far less stressable, mechanically-speaking, than the other stranded elements in an earth-wire overhead cable. In particular, the optical transmission elements can become damaged as the result of pinching during the clamping operation when conventional wire clamps are used.

Therefore, the object of the invention is to create a stranded bond of electrically conductive wires and optical transmission elements, in which the optical transmission elements are protected from pinching and other damaging mechanical influences.

The problem is solved according to the invention in that in at least one steel wire layer, at least one steel wire in the stranded bond is replaced by optical transmission element (5, 6, 7).

The advantage of the invention lies in the fact that the steel wires form a tension-proof and transverse-pressure resistant stranded core, in the case of which in at least one stranded layer, at least one steel wire is replaced by optical transmission elements, without the transverse-pressure resistance being significantly reduced. The transverse pressure which develops when the overhead cable is secured in a wire clamp is substantially absorbed by the supporting structure of the steel wires.

One or several layers of stranded elements made of hard aluminum or of an aluminum alloy with good conducting properties are configured around the stranded core. Due to their high conductivity, these elements take over a significant share of the task of transporting the electrical energy.

If a short-circuit should occur, the optical elements are protected from the high temperatures of the aluminum wires, due to the negligible thermal conductivity of the steel wires.

The invention can be advantageously developed by providing the optical transmission element(s) with a casing of a polyetherimide. Such a material is sold, for example, under the trademark "ULTEM" by the General Electric Co. This material offers an optimal protection against mechanical damages and is moreover stable when subjected to a lasting service temperature of up to 170° C. Through this means, the danger of damaging the optical transmission elements in case of an electric short-circuit are reduced. Alternatively, the casing can also consist of an aromatic polyamide, of polyoxymethylene or of a fluorinated polymer.

Figure 2:
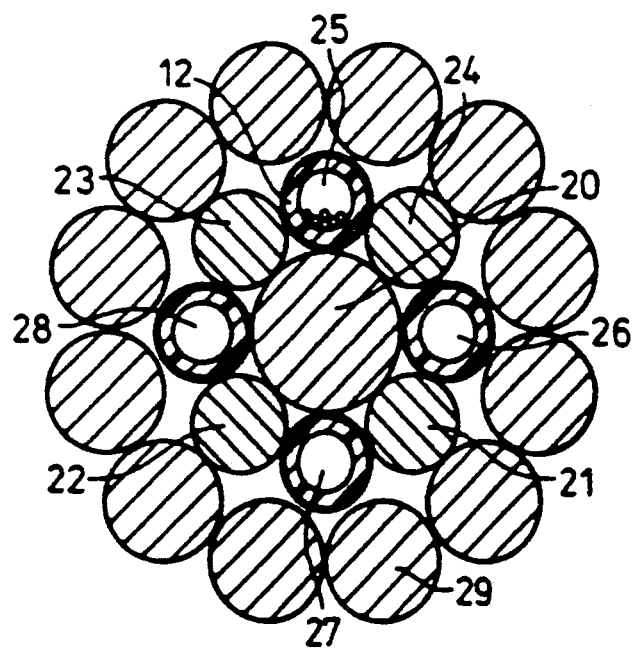

The invention shall be described based on the exemplified embodiment depicted in the drawings and clarified in the following. In the drawings, the Figures illustrate as follows:

FIG. 1 an earth-wire overhead cable in cross-section, in the case of which the central steel wire has the same diameter as the steel wires stranded on it;

FIG. 2 an earth-wire overhead cable, in the case of which the central steel wire has a larger diameter than the steel wires stranded on it.

FIG. 1 shows in cross-section an earth-wire overhead cable held by a clamp 10. The earth-wire overhead cable consists of a stranded bond of stranded elements of more or less the same diameter. Stranded on a central steel wire 1 are six stranded elements, of which three 2, 3, 4 consist of steel wire, while the other three 5, 6, 7 are configured of optical transmission elements. Twelve wires 11 made of hard aluminum or of an aluminum alloy with good conducting properties are stranded on to this stranded core. The external stranded layer of aluminum wires protects, inter alia, the optical transmission elements from outside, damaging, mechanical influences. The optical transmission elements 5, 6 and 7 each possess a protective case 12 made of a polyetherimide The pressure exerted radially on the cable by the wire clamp 10 is absorbed by the supporting structure of the steel wires 1, 2, 3, 4 and cannot endanger the optical transmission elements. The steel wires 2, 3, 4 have a diameter of 2.6 mm. The wires of aluminum or of a aluminum alloy with good conducting properties have a diameter of 2.4 mm.

In cross-section, FIG. 2 depicts an earth-wire overhead cable containing a central steel wire 20, which has a larger diameter than the other stranded elements. Stranded on this [central steel wire 20] are eight stranded elements, of which four 21, 22, 23, 24 consist of steel wire, while the other four 25, 26, 27, 28 are configured of optical transmission elements The central steel wire has a diameter of 3.3 mm, while the steel wires stranded upon it have a diameter of 2.1 mm. A layer of wires 29 of hard aluminum or of an aluminum alloy with good conducting properties is stranded on the stranded core. These wires have a diameter of 2.6 mm. Due to the fact that more stranded elements are found in the first stranded layer, because of the larger diameter of the central steel wire, than are found in the example depicted in FIG. 1, more stranded elements (namely at least 4) can be replaced in the stranded bond by optical transmission elements, without having to relinquish the supporting arrangement on the central steel wire 20. The optical transmission elements 25, 26, 27, 28 are each protected by a casing 12 made of a polyetherimide.

I claim:

1. An earth-wire overhead cable having integrated optical transmission elements and including several stranded elements, of which at least one contains an optical transmission element, the cable comprising:

a central steel wire;

at least one layer comprising a plurality of lines stranded onto the central wire, wherein one of said plurality of lines comprises an optical transmission element contained in a protective casing, and those of said plurality of lines not being optical transmission elements comprising steel wires, the central steel wire and said layer of steel wires and optical transmission elements stranded thereon forming a stranded core; and at least one layer of stranded elements configured onto said stranded core, the stranded elements being formed of a hard aluminum or of an aluminum alloy with conducting properties.

2. The earth-wire overhead cable according to claim 1 wherein said protective casing is formed of a polyetherimide.

* * * * *